Nov. 19, 1957  J. HOHL  2,813,331
METHOD AND APPARATUS FOR LOADING ELASTIC TUBES ON MANDRELS
Filed May 5, 1955  7 Sheets-Sheet 2
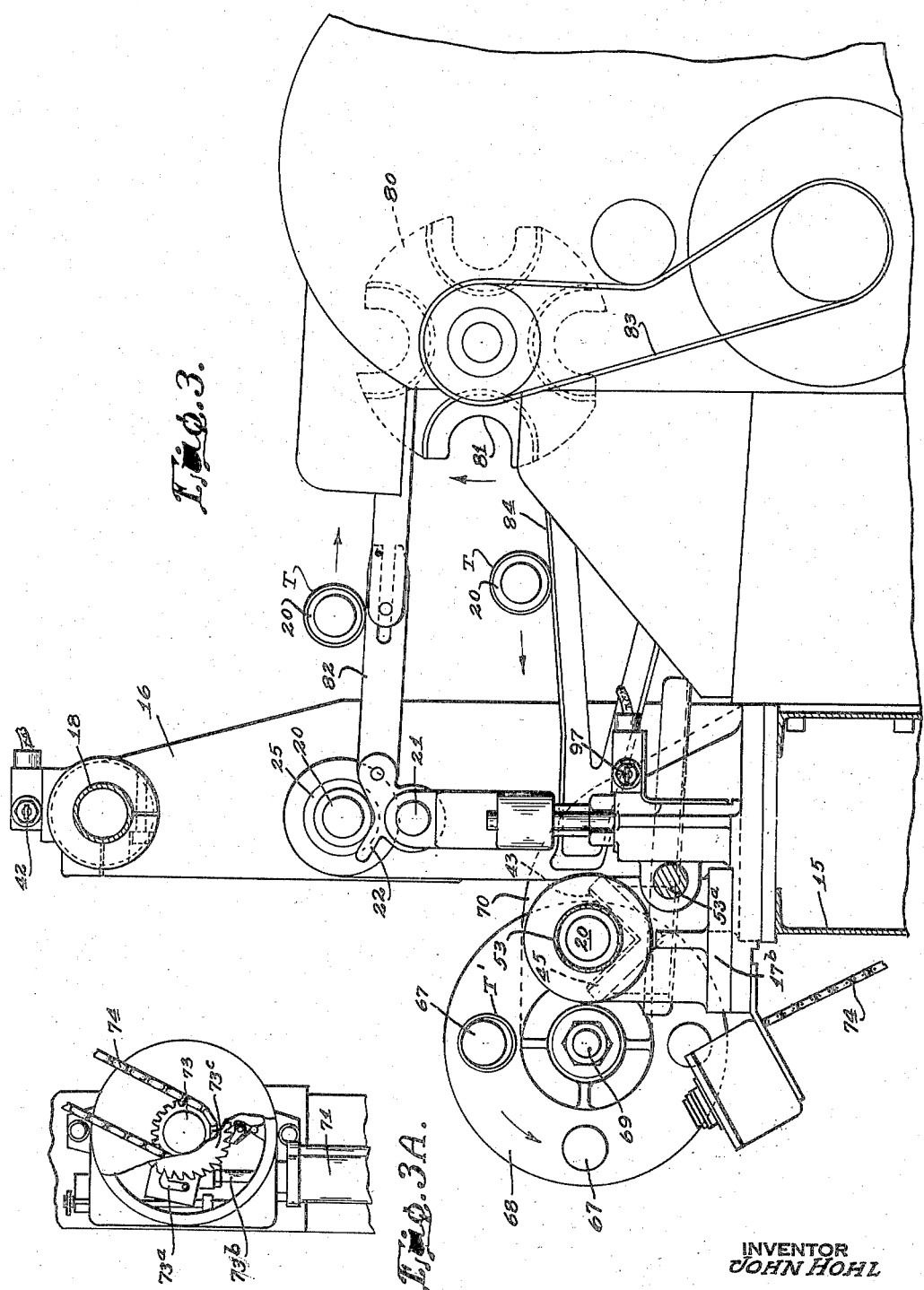
INVENTOR
JOHN HOHL
BY
ATTORNEYS Nov. 19, 1957  J. HOHL  2,813,331
METHOD AND APPARATUS FOR LOADING ELASTIC TUBES ON MANDRELS
Filed May 5, 1955  7 Sheets-Sheet 4
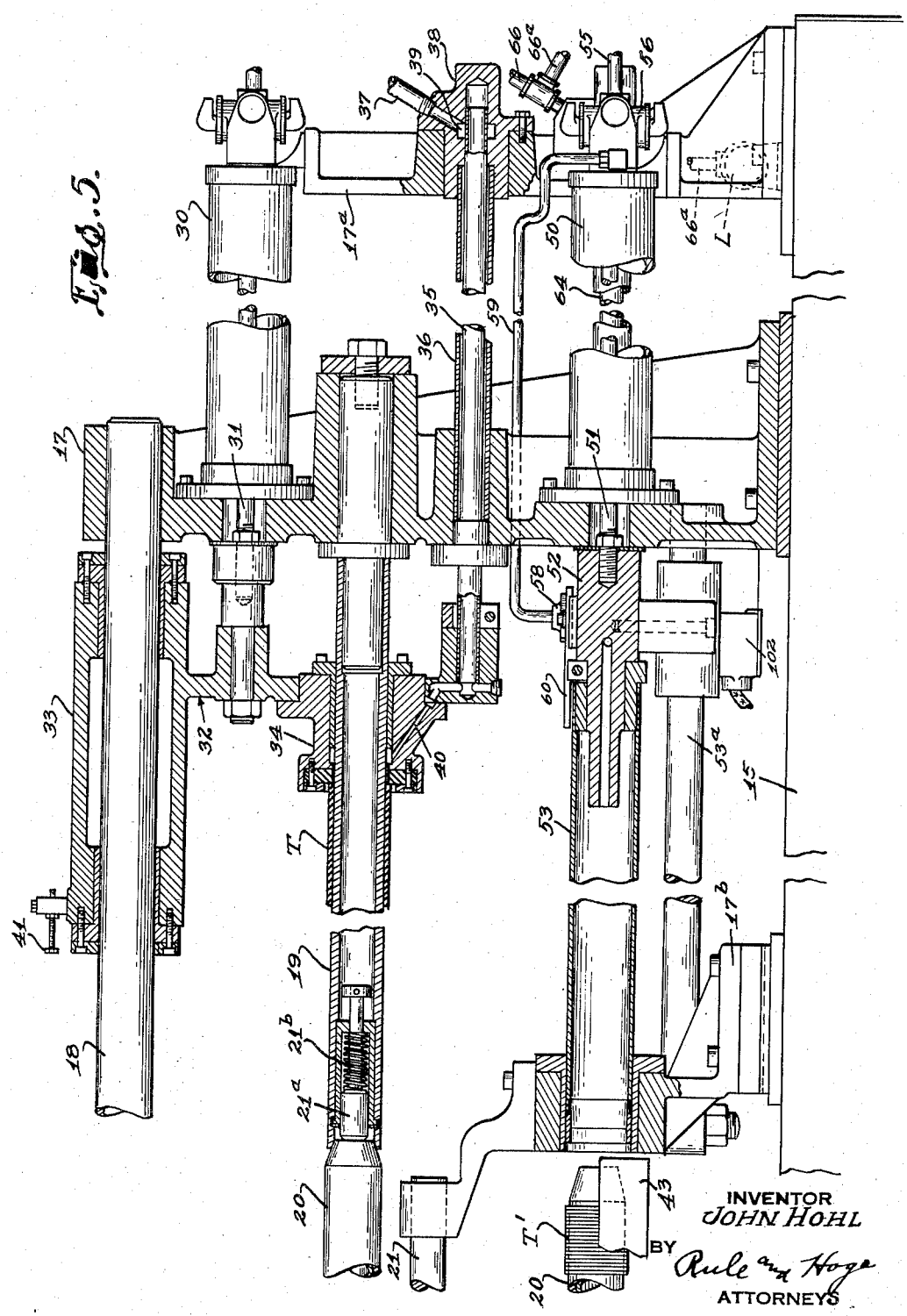
INVENTOR
JOHN HOHL
BY
ATTORNEYS

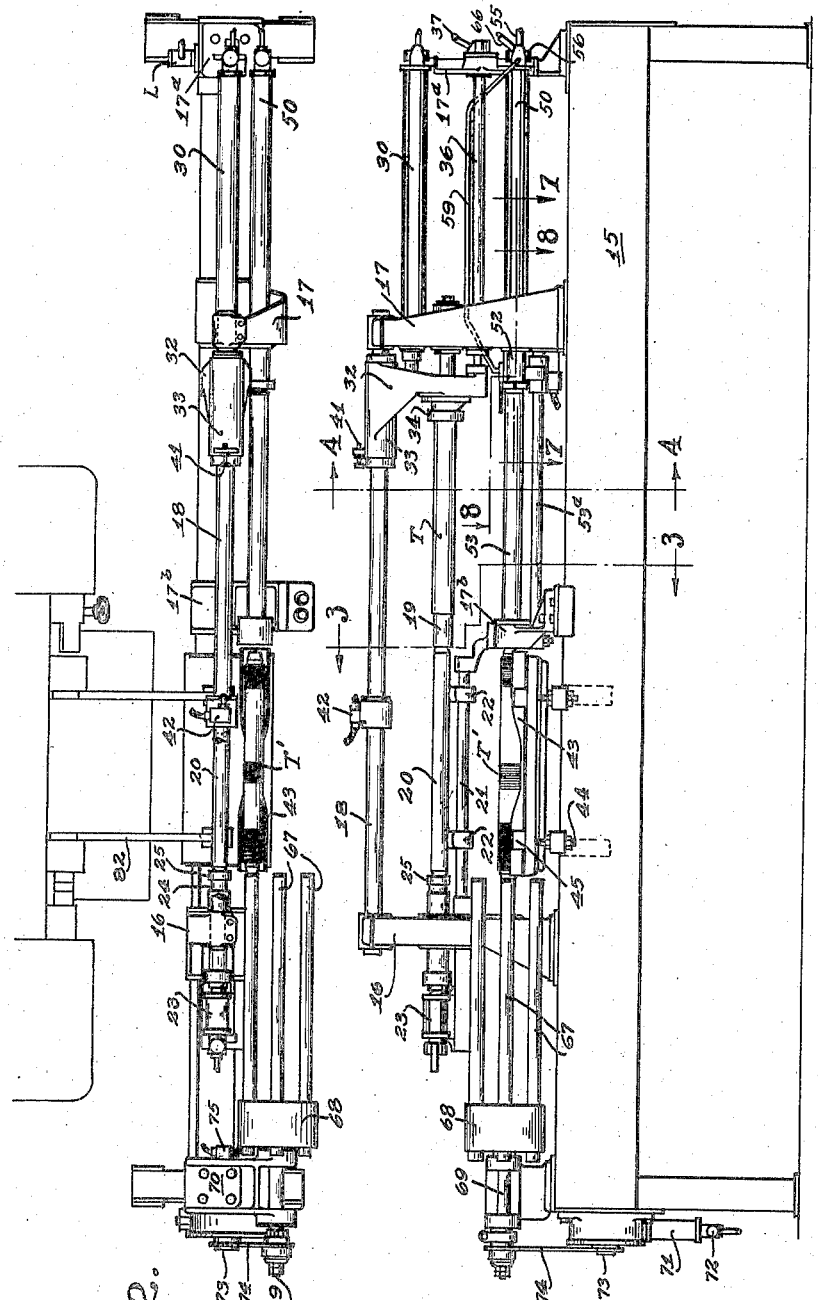

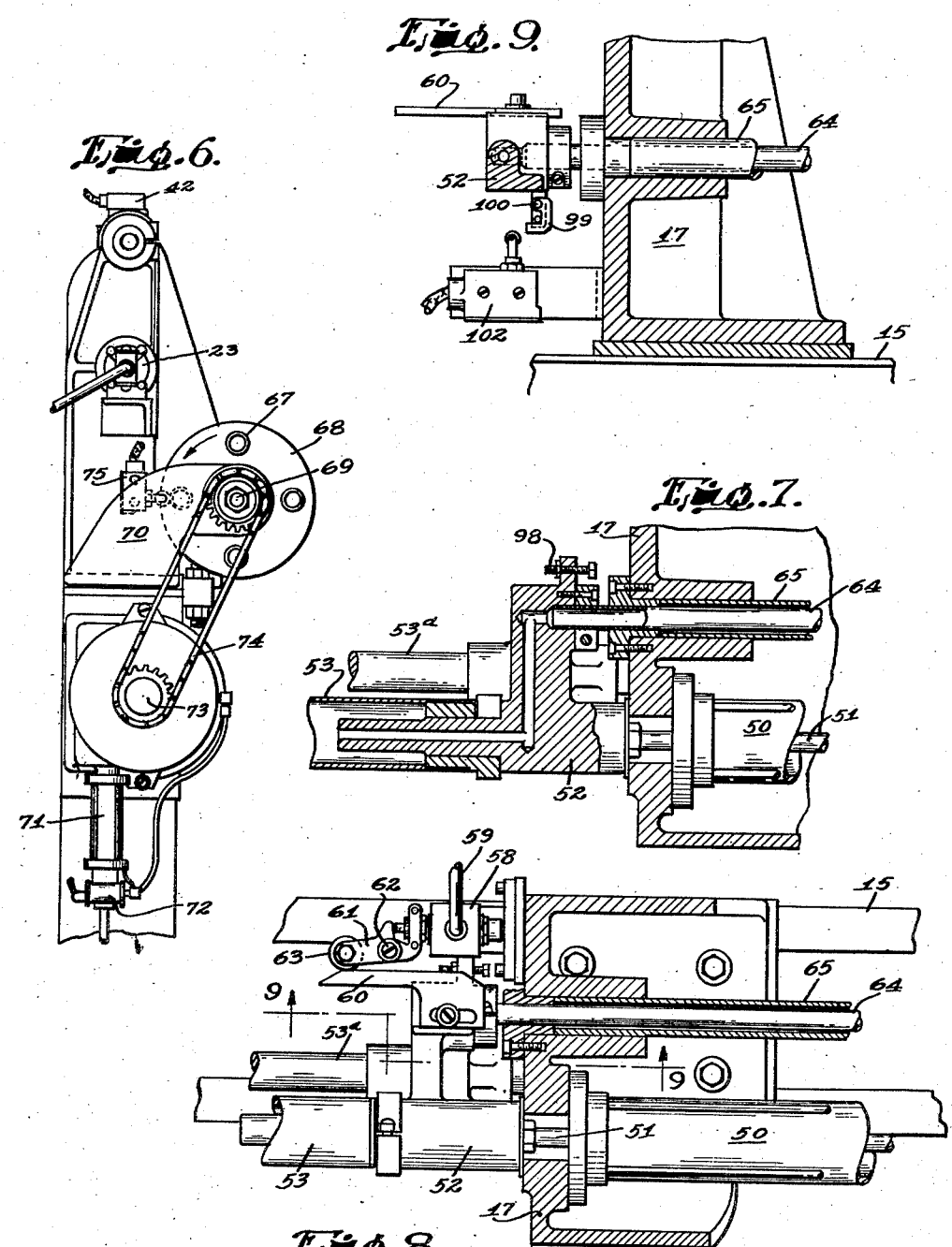

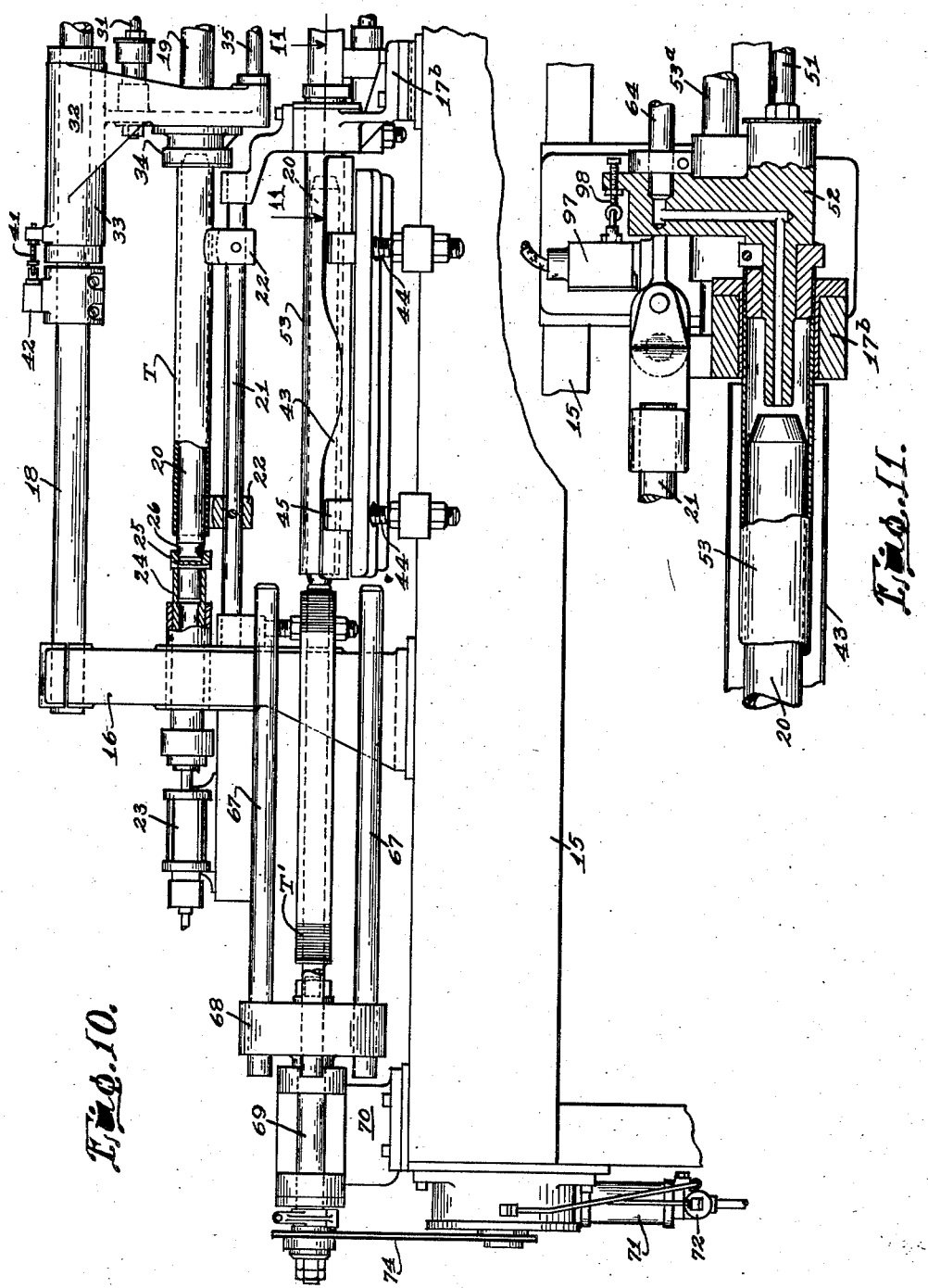

Nov. 19, 1957                J. HOHL                 2,813,331
         METHOD AND APPARATUS FOR LOADING ELASTIC TUBES ON MANDRELS
Filed May 5, 1955                                 7 Sheets-Sheet 7

INVENTOR
JOHN HOHL
BY
ATTORNEYS ated Nov. 19, 1957

2,813,331

METHOD AND APPARATUS FOR LOADING ELASTIC TUBES ON MANDRELS

John Hohl, Toledo, Ohio, assignor to Owens-Illinois Glass Company, a corporation of Ohio Application May 5, 1955, Serial No. 506,339

12 Claims. (Cl. 29—450)

My invention relates to apparatus and method for mounting tubes made of rubber or similar material on cylindrical mandrels, permitting the tubes to be cut into short lengths or rings.

The invention as herein illustrated and described is particularly adapted for loading rubber tubes on mandrels for use with a ring gasket cutting machine, such as disclosed in my copending application Serial No. 398,349, filed December 15, 1953, now Patent No. 2,785,750.

The present invention provides an apparatus comprising a horizontal tubular holder on which the operator slips a rubber tube lengthwise. A mandrel onto which the tube is to be transferred is placed in a cradle with the mandrel in line with the said holder. An air motor then advances the mandrel into engagement with the said holder. A second air motor or cylinder at the opposite end of said holder and tube then operates a blow head which moves forward along the tube holder and forces the tube lengthwise off the holder and onto the mandrel. Air pressure is applied through the blow head to the tube as the blow head advances and keeps the tube expanded so that it moves freely along the holder.

While the tube is being mounted thus on the mandrel, preparatory to cutting it into ring gaskets, a second mandrel with a tube thereon which has been cut into ring gaskets, is operated by another air cylinder for unloading the ring gaskets from the mandrel, as set forth and claimed in my copending application, Serial No. 592,821, filed June 21, 1956, Apparatus for Unloading Rings From a Mandrel. In this operation the air cylinder advances a tubular cylinder in longitudinal register with the mandrel so that the mandrel enters the cylinder and the ring gaskets are thereby forced off the mandrel. The operations of loading a tube onto the mandrel and removing the tube of cut gaskets from a second mandrel are thus carried on concurrently. The invention provides means by which the mandrels with the tubes mounted thereon are transferred to the gasket cutting machine and the mandrels with the cut gaskets then returned preparatory to having the cut gaskets removed from the mandrels.

Referring to the accompanying drawings:

Fig. 1 is an elevational view of a preferred form of apparatus embodying my invention;

Fig. 2 is a plan view of the same;

Fig. 3 is a cross-sectional elevation at the line 3—3 on Fig. 1, on a larger scale;

Fig. 3A is a detail view of indexing means for the ring holders;

Fig. 5 is a sectional elevation at the line 5—5 on Fig. 4, parts being broken away;

Fig. 6 is an end elevation;

Fig. 7 is a fragmentary sectional plan view at the line 7—7 on Fig. 1;

Fig. 8 is a fragmentary sectional view at the line 8—8 on Fig. 1;

Fig. 9 is a section at the line 9—9 on Fig. 8;

Fig. 10 is a front elevation of the apparatus with parts broken away and with movable parts in a different position from that shown in Fig. 1;

Fig. 11 is a fragmentary sectional view at the line 11—11 on Fig. 10;

Figure 4:
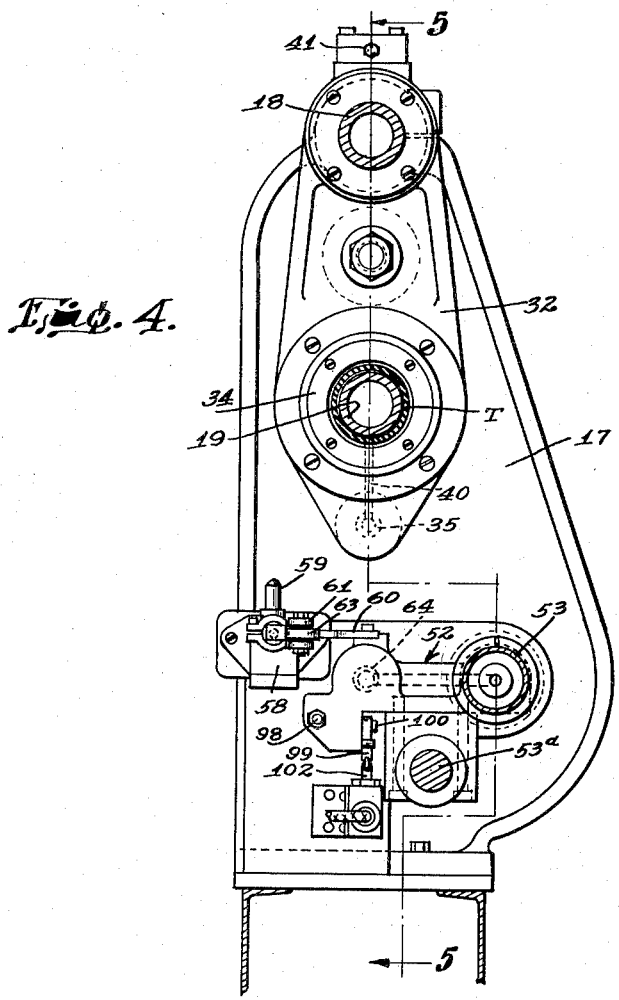
Fig. 4 is a sectional view at the line 4—4 on Fig. 1.

The apparatus is supported on a machine base 15 on which are mounted standards 16 and 17. A tubular frame member 18 has a fixed mounting at its ends in the standards 16 and 17.

Mounted on the standard 17 in fixed position is a horizontal tube 19 forming a holder adapted to receive a rubber tube T preparatory to mounting it on a mandrel 20. The empty mandrel is placed in a cradle 21, herein referred to as the "blow-on cradle," said cradle comprising a horizontal rod to which there are attached V-shaped holders 22 to receive the mandrels. An air-operated motor or cylinder 23 (Fig. 10) has a stationary mounting on the machine base in line with the mandrel 20 while the latter is supported in the cradle. The cylinder 23 operates to move the mandrel 20 lengthwise into engagement with the blow-on tube 19. The cylinder 23 has its piston connected with a tubular member 24 slidably mounted and provided with a head 25 to engage the tapered end 26 of the mandrel 20. This construction permits the mandrel with the tube T thereon to be lifted clear of the cradle 22. The forward end of the mandrel is also tapered as shown in Fig. 5 to engage the blow-on tube 19 by which it holds the mandrel clear of the cradle so as not to interfere with the tube T as the latter is moved lengthwise onto the mandrel.

Means for transferring the rubber tube T onto the mandrel comprises a horizontal cylinder 30 connected to the standard 17 and a standard 17a. The piston rod 31 of this cylinder is connected to a slide bracket 32 formed with a tubular guiding member 33 slidable on the frame member 18. The bracket 32 has attached thereto a head 34, herein termed a "blow-on head." The head 34 is slidably mounted on the tube 19. The tube T when placed by the operator on the blow-on tube 19 bears against the head 34. When the cylinder 30 operates to project the head 34, the tube T is pushed onto the mandrel. Air under pressure is supplied to the blow-on head 34 to assist in transferring the tube T. This pressure air is supplied through a blow-on tube 35 attached to the head 34 and extending parallel with the cylinder 30. The tube 35 is mounted for lengthwise movement in a stationary tube 36, the latter having a fixed mounting in the standards 17 and 17a. The air pressure is supplied through a pipe 37 extending to a port opening 39 in a head 38 in which the end portion of the tube 35 slides and which serves as a valve. When the blow-on head 34 is in its retracted position (Fig. 5) the port 39 is closed by the end portion of the tube 35.

Air pressure is supplied to the cylinders 23 and 30 simultaneously for effecting the transfer of the tube T onto the mandrel. The cylinder 23 operates very rapidly, moving the head 25 forward into engagement with the mandrel, then pushing the mandrel 20 forward into engagement with the tube 19 and simultaneously lifting it free of the cradle. The blow head 34 as it moves forward pushes the rubber tube forward so that the forward end of the tube T slides onto the mandrel. At the same time the blow tube 35 moves forwardly and after it has advanced a short distance, opens the port 39 so that air pressure is supplied through the tube 35 and through a channel 40 in the head 34. This air pressure operates to expand the tube T sufficiently to permit it to slide freely onto the mandrel. That is, the air pressure is applied between the tube T and the tube 19. As the blow head 34 nears the limit of its forward movement, a switch contact member 41 carried on the bracket 32 operates a reversing switch 42 controlling the air motors 23 and 30 as presently described so that the pistons of said motors are retracted, leaving the mandrel 20 with the tube T mounted thereon supported in the cradle 21. A push button 21$^a$ mounted in the tube 19 is projected outwardly by a compression spring 21$^b$ when the head 34 is withdrawn and separates the mandrel from the holder 19.

When the operator places an empty mandrel 20 in the cradle 21, he also places in a second cradle 43 a mandrel having mounted thereon a tube which has been cut into ring gaskets T'. The cradle 43 comprises V-shaped supports 45 carried on adjusting bolts 44.

The tube T' comprising the severed gaskets, is moved lengthwise off the mandrel by an air cylinder 50 mounted on the standards 17 and 17$^a$, below the cylinder 30. The piston rod 51 of the motor 50 is connected to a head 52 on which is mounted a horizontal tube 53, referred to as a "blow-off tube." The head 52 is slidably supported and guided on a stationary rod 53$^a$ attached at its ends to the standard 17 and a bracket 17$^b$ bolted to the machine base 15.

Figure 4A:
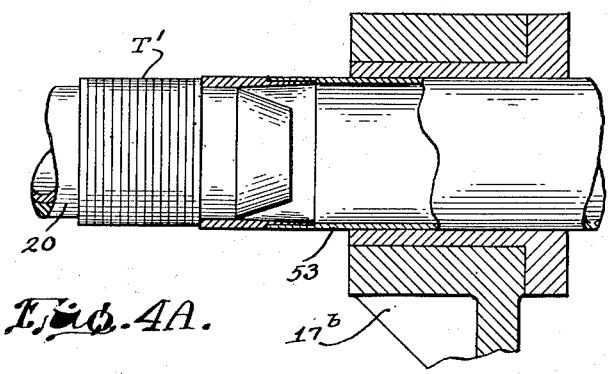
Fig. 4A is a detail view showing the "blow-off" tube in operative position.
Figure 13:
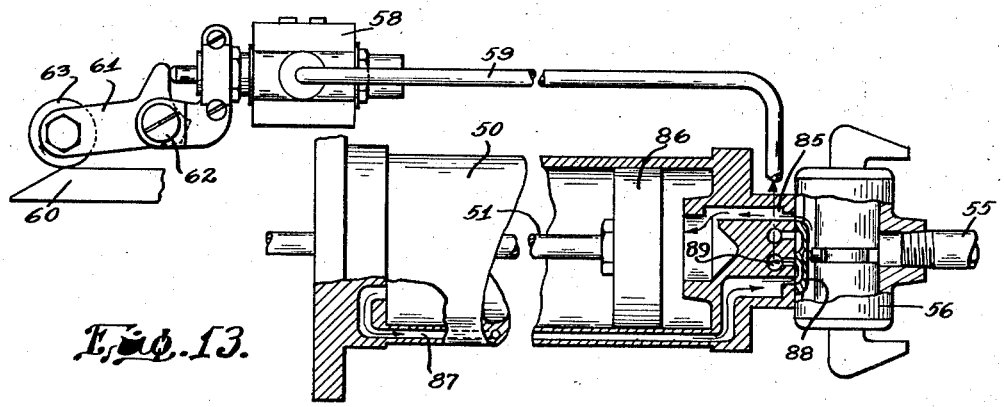
Fig. 13 is a part sectional view of the "gasket blow-off" cylinder and means for controlling its operation.

The tube 53 is in line with the mandrel on the cradle 43 and as shown in Fig. 4A is of an internal diameter to admit the mandrel while the end of the tube bears against the rings T'. While the blow-off tube 53 is advancing and pushing the rings off the mandrel, air pressure is maintained within the tube 53 and operates as presently described to assist in moving the rings off the mandrel. Air pressure for operating the cylinder 50 is supplied through a pipe 55 and control valve 56. During the initial forward stroke of the blow-off tube 53, the speed is retarded in order to permit the air pressure to get under the gaskets T' so that they are only loosely supported on the mandrel, thus permitting them to be moved freely along the mandrel as they are discharged therefrom. This retarding movement is under the control of a valve 58. The exhaust air from the cylinder 50 is passed through the valve 58 as presently described. The valve 58 is under the control of a cam 60 adjustably mounted on the head 52. The valve 58 is actuated by a rock arm 61 which swings on a pivot 62 and carries a cam follower roll 63. The cam operates the valve to throttle the air flow to an extent determined by the adjustment of the parts. The cam is also adjustable to adjustably vary the distance through which the tube 53 advances while the air is throttled. As the head 52 moves forward the cam operated lever 61 is released so that the forward movement of the tube 53 is no longer retarded. The means for controlling and directing the flow of air within the cylinder 50 and through the control valve 58 is as follows:

The air under pressure supplied through the pipe 55 is directed through a port 85 (Fig. 13) into the cylinder behind the piston 86 and moves the piston forward. The exhaust air in front of the piston is returned through a channel 87 which may be formed in the cylinder wall. A valve slide 88 in the valve head 56 directs the air through a port 89 to the pipe 59 extending to the valve 58. The flow of air through the valve 58 being throttled as above described produces a back pressure which retards the forward movement of the piston 86. When the valve 58 is opened by the roll 63 running off the cam 60 the back pressure is relieved permitting the piston to move forward at a higher speed. Valve solenoids 90, 91 (Fig. 12) control the reversal of the air motor 50. When the solenoid 90 is energized the valve slide 88 is reversed thereby supplying air pressure through the channel 87 for returning the piston 86, the exhaust air behind the piston being discharged through the port 85, pipe 59, and valve 58.

Figure 12:
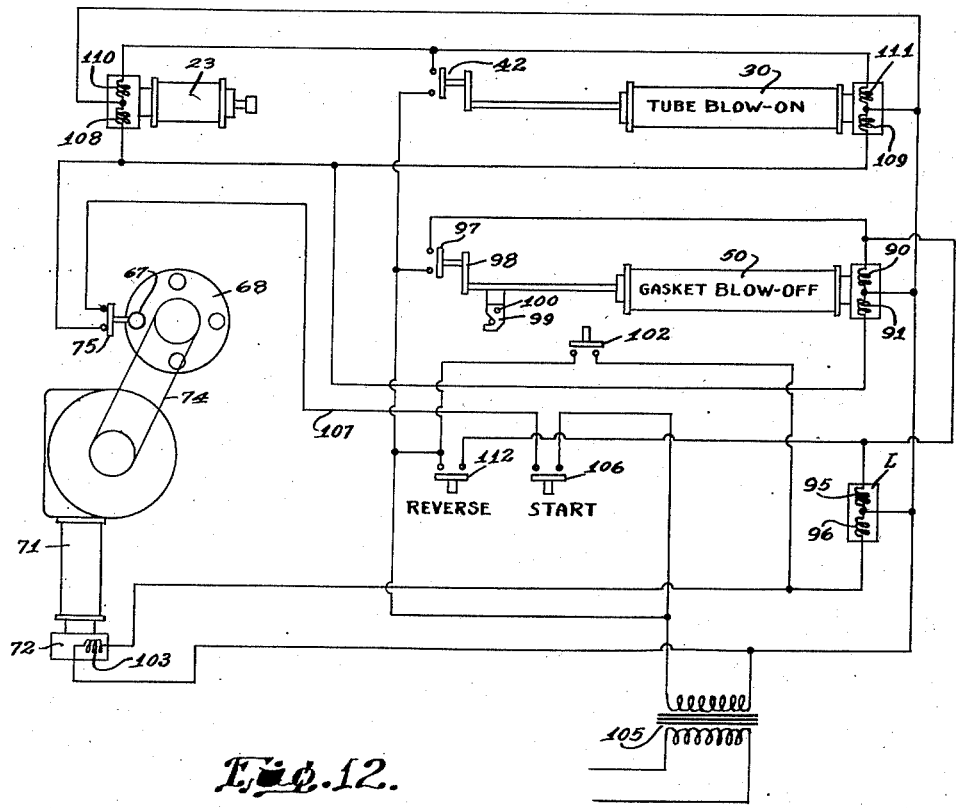
Fig. 12 is a schematic diagram of the apparatus, showing particularly the electrical control system.

Air under pressure is supplied within the tube 53 through a pressure tube 64 (Figs. 7 to 9), said tube being connected to the head 52 for reciprocating movement therewith. The tube 64 extends through a sleeve 65 mounted in the standards 17 and 17$^a$. Air pressure is supplied to the tube 64 through a pipe 66. The air supply during the initial movement of the tube 53 is retarded and controlled in the same manner as the air supply through the pipe 35 controlled at the valve port 39 and by a like construction. The operation of the cylinder 50 for blowing the gaskets T' off the mandrel takes place concurrently with the operation of the cylinder 30 by which the tube T is moved onto the mandrel, air pressure being supplied to the cylinders 30 and 50 simultaneously. During the return stroke of the tube 53 the air pressure supplied through the head 52 is increased to insure the mandrel being blown out of the tube as the lower air pressure may not be sufficient to be relied on for this purpose. The high pressure air is supplied through a pipe 66$^a$ under the control of a high pressure air valve L (Figs. 5 and 12). This valve comprises solenoids 95 and 96 for closing and opening the valve. A switch 97 having a stationary mounting is closed by an adjustable switch operating contact device 98 mounted on the head 52 for closing the switch as the tube 53 nears the end of its forward stroke. The closing of the switch 97 completes the circuit for the solenoid 95 thereby opening the high pressure valve L. The valve L is open during a portion of the return movement of the cylinder 50 and the tube 53 and then closed by means of a switch operating dog 99 (Figs. 9 and 12) on the head 52. The dog swings on a pivot 100. As the head 52 nears the end of the return stroke the dog 99 operates to close a switch 102. This completes a circuit through the solenoid 96 of the valve L, thereby closing the valve and shutting off the high pressure air. The closing of the switch 102 also completes a circuit for the solenoid 103 of the valve 72 so that the indexing cylinder 71 operates to impart a step rotation to the spider 68.

Means for receiving the ring gaskets T' from the mandrel includes horizontal rods 67 carried on a circular spider 68 on a shaft 69. The shaft is journaled in a bracket 70 on the machine base. The spider or head 68 is rotated intermittently step by step to bring the rods 67 in succession into line with the mandrels while the latter are supported in the cradle 43. The means for imparting step by step rotation to the head 68 comprises an air-operated cylinder 71 under the control of a solenoid valve 72. The cylinder has a conventional pawl and ratchet driving connection with a shaft 73. This includes a pawl 73$^a$ (Fig. 3A) connected to the piston rod 73$^b$ and driving a ratchet wheel 73$^c$ on the shaft 73. This motion is transmitted from the shaft 73 to the shaft 69 through a sprocket chain 74 and gears. A switch 75 has a stationary mounting in position to be controlled by the rods 67, the switch being closed only while a rod 67 is in position to receive the ring gaskets from a mandrel in the cradle 43.

Referring to Fig. 3, there is provided means for transferring the loaded mandrel to the gasket cutting machine and, after a tube has been cut into ring gaskets, returning the mandrel to the unloading station where the cut gaskets are transferred to one of the arms 67. The gasket cutting machine includes a mandrel carrier 80 with cradles 81. Forwardly and downwardly inclined guide bars 82 provide a runway extending from the cradle 21 to the carrier 80. The operator places a loaded mandrel on the runway permitting it to roll to the carrier 80. The latter is rotated step by step in a clockwise direction, being driven by a belt 83 so that the cradles 81 receive the loaded mandrels and transfer them to a cutting station where the tube is cut into gaskets by a cutter (not shown). The mandrels carrying the cut gaskets are returned on a lower inclined runway 84 to a position adjacent to the cradle 45 onto which the mandrels are placed by the operator as heretofore described.

Operation

The sequence of operations will now be described having reference to the wiring diagram (Fig. 12). Electric current for operating the control devices is supplied through a transformer 105. The operator first places an empty tube T on the holder 19, places an empty mandrel 20 in the cradle 21 and a mandrel loaded with gaskets T' in the cradle 43. He then closes the manual starting switch 106 which completes a circuit from the transformer secondary through the lead 107, switch 75, and starting solenoid 108 of the mandrel centering cylinder 23. The circuit is also completed through the solenoid 91 of the gasket blow-off cylinder 50 and through solenoid 109 of the tube blow-on cylinder 30 so that the cylinders 23, 30, and 50 are all brought into operation. The cylinder 23 operates quickly to advance the head 25 (Fig. 10) and align the loaded mandrel 20 with the holder 19. The cylinder 30 operates to push the tube T onto the mandrel 20. As soon as the head 34 has moved forwardly a short distance, the port 39 (Fig. 5) is opened to supply air pressure between the tube T and the carrier 19 as heretofore described. The blow-off cylinder 50 operates concurrently with the cylinder 30 but its movement is restricted during the initial portion of its advance by the back pressure of the exhaust air under the control of the cam 60 and the valve 58. When the valve is released from the control of the cam, the restriction is removed permitting unrestricted forward movement of the blow-off tube 53. When the tube 53 has advanced a short distance the air pressure supplied through the tube 64, which is throttled during the initial movement, is opened to the pipe 53 for supplying low pressure air between the mandrel and the ring gaskets T' while the latter are being pushed off the mandrel. As the piston of the cylinder 30 is completing its forward stroke it closes the switch 42. This completes the circuit for the valve solenoid 110 for reversing the cylinder 23 and also completes a circuit through solenoid 111 which reverses the blow-on cylinder 30. The cylinder 23 now retracts its piston permitting the push button 21ᵃ (Fig. 5) to disengage the mandrel 20 from the holder 19 leaving the mandrel free in the cradle 21. The cylinder 30 also retracts the head 34. The cylinder 50 as it completes its forward stroke closes the switch 97 and completes the circuit for the solenoid 90 so that the cylinder 50 is reversed. At the same time the circuit is completed through the solenoid 95 of the high pressure valve L so that high pressure air is supplied through the tube 53 for blowing the mandrel out of the tube. During the retracting movement of the cylinder 50 the dog 99 closes the switch 102. This makes a circuit for the solenoid 96, so that the valve L cuts off the high pressure air. The closing of the switch 102 also makes the circuit for the solenoid 103 of the indexing cylinder 71 so that the latter operates to index the spider 68. The operator can now remove the loaded mandrel from the cradle 21 and place it on the runway 82 (Fig. 3) by which it is transferred to the gasket cutting machine. This completes the cycle. A reversing switch 112 may be closed at any time by the operator for making a circuit through the solenoid 90 and thus retracting the blow-off tube 53 from any intermediate position. Closing of the reversing switch also operates to shut off the high pressure valve L.

Modifications may be resorted to within the spirit and scope of my invention.

I claim:

1. The method of loading an elastic collapsible tube onto a cylindrical mandrel, which comprises placing the tube on a cylindrical support which extends lengthwise through the tube and substantially fills the tube throughout its length, positioning the mandrel at one end of the support and in line therewith, moving the tube lengthwise from the support onto the mandrel by pressure applied at the end of the tube remote from the mandrel and in a direction lengthwise thereof and concurrently applying at said end of the tube pneumatic pressure in sufficient amount to inflate the tube to such extent that it moves freely off the support and onto the mandrel, said support being cylindrical and of slightly less diameter than the mandrel, said pneumatic pressure being maintained throughout the transfer of the tube to the mandrel.

2. Apparatus for loading a tube onto a cylindrical mandrel, which comprises a cylindrical holder on which the tube is placed with the holder extending the length of the tube and substantially filling the tube, means for supporting the mandrel in alignment with said holder, a pusher mounted for sliding movement lengthwise of the holder and arranged to engage the end of the tube, means for moving said pusher lengthwise of said holder and thereby pushing the tube forward off the holder and onto the mandrel, and means for supplying pneumatic pressure and directing it to the end of the tube which is engaged by said pusher and thereby supplying pressure within the tube and extending along the tube and support and thereby expanding the tube sufficiently to permit it to slide freely off the support and onto the mandrel.

3. The apparatus defined in claim 2, including a pressure line through which the pneumatic pressure is transmitted to the said pusher, and valve means operable automatically to throttle the fluid pressure supply during the initial forward movement only of the pusher.

4. Apparatus for mounting an elastic tube onto a cylindrical mandrel, which comprises a stationary cylindrical holder on which the tube is placed, means for mounting and retaining said holder stationary in a fixed position, said holder being approximately the same diameter as the mandrel, a cradle in which the mandrel is supported at one end of said holder and with the mandrel extending in line with the holder and spaced therefrom, a pusher positioned and arranged to engage the mandrel and push it lengthwise into engagement with the said holder, a second pusher mounted for movement lengthwise of the holder and operable to push the tube lengthwise from the holder onto the mandrel while the holder and said first mentioned pusher are held stationary, and means for supplying air pressure within the tube during its transfer and thereby expanding it sufficiently to permit free sliding movement onto the mandrel.

5. The apparatus defined in claim 4, means for operating said pushers comprising piston motors operatively connected respectively to the pushers, and motor control means by which operating power is supplied simultaneously to said motors.

6. Apparatus for mounting a tube of rubber or rubber-like material onto a cylindrical mandrel, comprising a cylindrical holder for the tube, a stationary support on which the holder is mounted with the holder horizontal and extending forward from said support, means for supporting the mandrel in alignment with said holder and with the end of the mandrel in engagement with the outer end of the holder, a piston motor, a head connected to the motor piston and mounted on the said holder for sliding movement lengthwise thereof, said head being positioned to engage the end of the tube and push the tube lengthwise onto the mandrel when the motor piston is projected, an air pressure pipe connected to said head for movement therewith, said pipe extending in the direction of movement of said head, a channel extending from said pipe through said head and through which air under pressure is transmitted and applied between the tube and its holder and by which the tube is expanded sufficiently to permit free sliding movement onto the mandrel, and means to throttle the supply of air pressure through said pressure pipe during the initial forward movement of said head.

7. The appartus defined in claim 6, the said throttling means comprising a bearing block in which the end portion of the pressure pipe is slidably supported during said initial movement of the tube, and a pressure line extending into said bearing block and through which pressure is transmitted to said pressure pipe.

8. Apparatus comprising a cylindrical mandrel with tapered end portions, a support for the mandrel, piston motors in line with the mandrel and positioned at opposite ends thereof, a tubular holder on which a tube is mounted, said holder being in line with the mandrel, a stationary support to which the end of the holder remote from the mandrel is attached and by which the holder is held in a fixed position, the piston of one of said motors having a head operated by its motor to engage one end of the mandrel and move it lengthwise into position in which the opposite end of the mandrel is in engagement with the free end of said tubular holder, and means operated by the other cylinder to move the tube lengthwise off said holder and onto the mandrel while the mandrel is held stationary by said head and holder, the last mentioned means comprising a head surrounding the holder and slidable lengthwise thereof throughout the transfer of the tube from the holder to the mandrel.

9. The apparatus defined in claim 8 including a spring loaded pusher button mounted in said holder in position to engage the mandrel and push it free from the holder.

10. Apparatus for mounting tubes on mandrels, comprising a cylindrical holder on which a tube is mounted, a stationary frame, means for attaching said holder at one end thereof to the frame and holding it in a fixed horizontal position with the opposite end of said holder free, a cradle mounted adjacent the free end of said holder and in position to hold a mandrel in horizontal position and spaced from said holder, a piston motor comprising a piston rod reciprocable horizontally in axial alignment with said holder, a head carried by the piston rod for engagement with the mandrel and operable to move the mandrel lengthwise into engagement with said holder, a second piston motor, a pusher head connected to the piston of said second motor and slidably mounted on said holder in position to engage the end of a tube placed on the holder, said second motor operable to move said pusher head lengthwise of the holder and thereby slide the tube off the holder and on to said mandrel, the extent of said movement of the pusher being at least equal to the length of the tube so that the pusher is operable to move the tube completely off the holder and on to the mandrel.

11. The apparatus defined in claim 10, the mandrel having tapered ends, said holder and said head on the motor piston rod each being formed with a recessed end portion to engage the tapered ends of the mandrel and thereby lift the mandrel off the cradle and align it with the said holder and motor piston rod.

12. The apparatus defined in claim 10 including means providing an air pressure line extending to the pusher head on the holder, the pressure line including a blow tube connected to the pressure head for movement therewith, a valve port in the pressure line closed by said blow tube while the pusher head is in its retracted position and opened by the forward movement of the blow tube when the pusher has been moved forward a short distance from its retracted position.

References Cited in the file of this patent
UNITED STATES PATENTS

| | | |
|---|---|---|
| 1,037,159 | Lorenz | Aug. 27, 1912 |
| 1,322,843 | Townsend | Nov. 25, 1919 |
| 1,647,358 | Hubbard | Nov. 1, 1927 |
| 1,852,613 | Jessen | Apr. 5, 1932 |
| 1,934,660 | Fairchild | Nov. 7, 1933 |
| 1,967,374 | Scott | July 24, 1934 |
| 2,604,658 | Broden | July 29, 1952 |
| 2,645,004 | Dorner | July 14, 1953 |
| 2,670,576 | Hockett | Mar. 2, 1954 |